United States Patent
Hauser et al.

[11] 3,819,295
[45] June 25, 1974

[54] COOLING SLOT FOR AIRFOIL BLADE

[75] Inventors: Ambrose A. Hauser, Cincinnati; Terry T. Eckert, Mt. Healthy; James D. McDonel, Loveland, all of Ohio

[73] Assignee: General Electric Company, Cincinnati, Ohio

[22] Filed: Sept. 21, 1972

[21] Appl. No.: 291,005

[52] U.S. Cl. .................................................. 416/97
[51] Int. Cl. ............................................. F01d 5/18
[58] Field of Search .......... 416/96, 97; 29/156.8 H; 165/168

[56] References Cited
UNITED STATES PATENTS

| | | | |
|---|---|---|---|
| 1,884,612 | 10/1932 | Dinzl | 165/168 |
| 3,329,596 | 7/1967 | Abt et al. | 416/96 UX |
| 3,420,502 | 1/1969 | Howald | 416/97 |
| 3,584,972 | 6/1971 | Meginnis et al. | 416/96 UX |
| 3,620,643 | 11/1971 | Jones | 416/90 |
| 3,628,880 | 12/1971 | Smuland et al. | 416/96 UX |
| 3,688,833 | 9/1972 | Bykov | 416/96 UX |
| 3,700,348 | 10/1972 | Corsmeier et al. | 416/90 |
| 3,700,418 | 10/1972 | Mayeda | 29/180 SS |

FOREIGN PATENTS OR APPLICATIONS 845,227  8/1960  Great Britain ........................ 416/97

Primary Examiner—Everette A. Powell, Jr.
Attorney, Agent, or Firm—James M. Kipling; Derek P. Lawrence

[57] ABSTRACT

A cooling slot for passing cooling fluid through a heated plate such as an airfoil blade for use in gas turbine engines is created by forming a first plurality of passages within the blade, and then forming a second plurality of passages within the blade, wherein preselected of the passages of the second plurality intersect at least one of the passages of the first plurality to define a number of nodes between the points of intersection. When cooling fluid is passed through the blade, the nodes act as turbulence promoters and area increasers for improving convective heat transfer between the blade and the cooling fluid.

4 Claims, 3 Drawing Figures

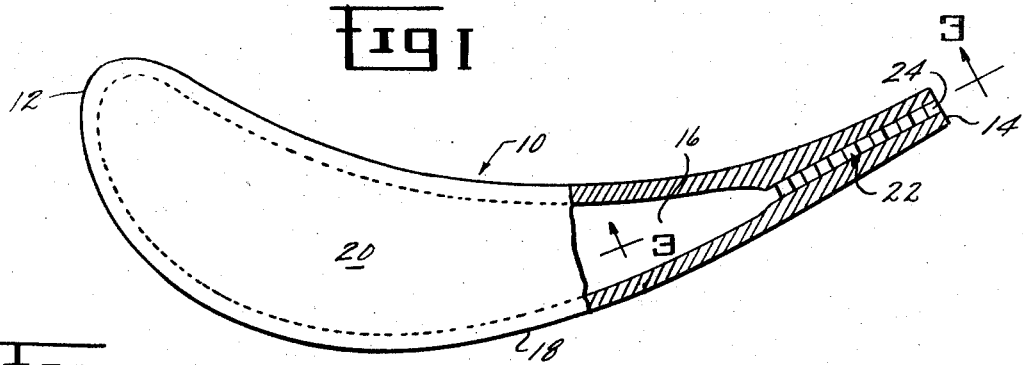
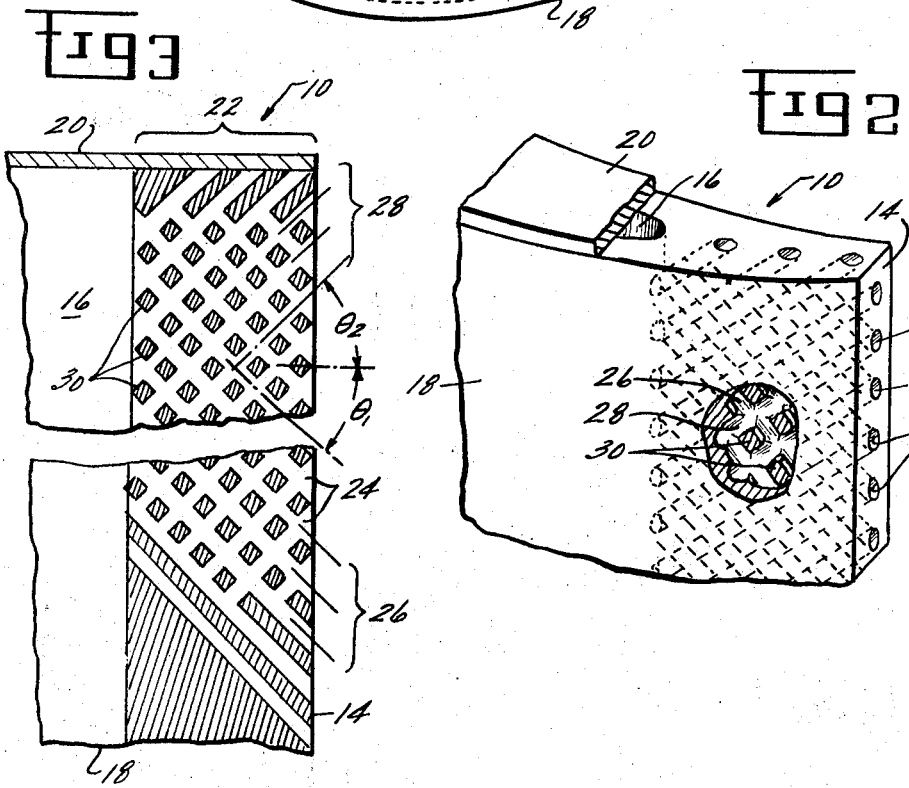

COOLING SLOT FOR AIRFOIL BLADE

BACKGROUND OF THE INVENTION

The present invention relates to the cooling of heated plates, and more particularly to the cooling thereof by means of a cooling slot passing therethrough.

The invention herein described was made in the course of or under a contract, or a subcontract thereunder, with the United States Department of the Air Force.

The cooling of heated plates in various machinery types has been performed by a multiplicity of methods. One such method is the passing of a cooling fluid through a cooling slot within the plate. It has been found that the convective heat transfer of this type cooling is improved in efficiency by promoting turbulence within the cooling slots.

Heated plate cooling concepts have found particular application in the gas turbine engine art wherein it is often desired to partially cool airfoil blades (of the compressor or turbine blade variety) by passing cooling fluid from an internal cavity within the blade through a cooling slot located in the trailing edge of the airfoil blade. In the past the trailing edge slot has been provided with a number of protuberances or nodes which extend from the walls of the slot into the slot and engage the cooling fluid passing therethrough. These nodes serve the dual functions of promoting turbulent fluid flow through the slot and additionally of increasing the surface area of the trailing edge presented to the cooling fluid. These two functions combine to substantially improve the efficiency of heat transfer from the trailing edge to the cooling fluid.

The fabrication of airfoil blades incorporating such a noded trailing edge slot has been a particular problem in the prior art, which has relied upon either casting or sheet metal fabrication techniques. Casting has limitations due to the relatively difficult coring and brazing problems involved. Sheet metal fabrication has proven difficult due to the requirement that the braze alloy melt at temperatures considerably lower than the melting point of the parent material. These latter characteristics are particularly unsuitable for use in gas turbine engines operating at elevated temperatures.

The present invention provides solution to the fabrication problems of the prior art by permitting the installation of turbulence promoting nodes within slots and trailing edges (and similarly in other heated plate applications) which result neither from casting nor sheet metal fabrications, by means of the formation of intersecting passages through the trailing edge by conventional means such as crossdrilling.

BRIEF SUMMARY OF THE INVENTION

It is therefore an object of the present invention to provide an improved cooling slot for use with heated plates.

It is a more particular object of the present invention to provide a relatively inexpensive and reliable cooling slot fabrication for use in trailing edge slots of airfoil blades.

It is another object of the present invention to provide a method for forming an improved cooling slot according to the present invention wherein the limitations of sheet metal fabrication and casting are removed from issue.

The foregoing, as well as other objects which will become apparent hereinafter, are accomplished in the present invention by the formation of a cooling slot by providing pluralities of intersecting passages extending downstream of an internal blade cavity and through the trailing edge. The intersections of the plurality of passages define a number of nodes at points between the intersections. In one embodiment of the present invention, two pluralities of passages extend through the trailing edge, each plurality aligned at a predetermined angle with respect to the trailing edge, the passages of each plurality being substantially parallel with one another, and the passages of both pluralities being coplanar. The shape of the resulting nodes can be determined by the shaping of the passages as well as by the angle of the passages with respect to the trailing edge and by the spacing of the passages. It has been found that improved heat transfer efficiency occurs when the nodes are formed with a sharp point at their upstream ends within the slot.

The present invention also provides a method for the formation of the improved cooling slots, the method, in one form, including the steps of forming a first plurality of cooling passages, and forming a second plurality of cooling passages wherein preselected of the second passages intersect preselected of the first passages defining a plurality of nodes.

BRIEF DESCRIPTION OF THE DRAWING

The characteristics of the present invention will be described with particularity in conjunction with the appended drawing wherein:

FIG. 1 is a cross-sectional view of an airfoil blade incorporating elements of the present invention;

FIG. 2 is a perspective view in partial section of a trailing edge slot according to the present invention incorporated within the blade of FIG. 1; and FIG. 3 is a section view of a trailing edge cooling slot similar to that in FIG. 2, and taken along line 3—3 of FIG. 1.

DETAILED DESCRIPTION OF THE INVENTION

The cooling slot of the present invention will be described hereinafter in conjunction with and in the environment of an airfoil blade suitable for use as a compressor blade or a turbine blade of a gas turbine engine. It will become apparent that the concepts of the present invention are not limited to such application, but are suitable for use in diverse applications wherein a heated plate is desirably cooled by a fluid passing therethrough.

An airfoil blade 10 in partial section view is depicted in FIG. 1. The blade has a leading edge 12 and a trailing edge 14 in addition to an internal cavity 16 which, during operation, houses a quantity of cooling fluid. The body portion 18 of the blade is capped by a tip cover 20 which isolates the internal cavity 16 from the environmental atmosphere. A trailing edge cooling slot 22 extends downstream from the cavity 16 within the trailing edge 14 and provides communication between the cavity 16 and the trailing edge 14 and opens into the surrounding atmosphere downstream of the trailing edge.

FIGS. 2 and 3 combine to disclose pertinent characteristics of the present invention relating to the trailing edge cooling slots 22 of blade 10. These Figures disclose that the trailing edge slot 22 is formed of a plurality of individual passages extending downstream from internal cavity 16 and opening through a number of exit ports 24 into the atmosphere downstream of the trailing edge 14. More particularly, in the embodiments depicted in FIGS. 2 and 3 of the present invention, the trailing edge slot is formed of a first plurality of passages 26 substantially parallel with one another, coplanar, and aligned in a predetermined first angle $\theta_1$ with respect to the trailing edge 14 of the blade 10. A second plurality of passages 28 cooperates therewith, the latter plurality also being parallel, coplanar and aligned at an angle $\theta_2$ with respect to the trailing edge of the blade. In this form, the passages 26 and 28 may be formed by crossdrilling — that is, by drilling the first set of passages at an angle of $\theta_1$ opening through ports 24, and subsequently drilling the second plurality of passages at an angle of $\theta_2$ opening through the same exit ports 24.

In this configuration, the first and second pluralities of passages are formed in such a way that preselected of the passages of one plurality intersect at least one of the passages of the other plurality. In the present embodiment, substantially all individual passages intersect a number of passages of the other plurality. As a result, a plurality of nodes 30 is defined between the points of intersection of the two pluralities of passages 26 and 28. The shape and size of the nodes 30 is determined by the shape, size, position, and orientation of the pluralities of passages. Hence, an optimum node shape and size may be attained and effectuated easily by adjusting the aforementioned parameters. Suitably the nodes 30 depicted in FIGS. 2 and 3 are substantially rectangular in cross section.

The present invention also comprehends a method for forming the plurality of nodes 30 of trailing edge cooling slot 22, and this method comprises the steps of: forming the first plurality of passages 26 extending from internal cavity 16 through trailing edge 14 at an angle $\theta_1$ with respect to the trailing edge, the passages of the first plurality being substantially parallel with one another and coplanar; forming the second plurality of passages 28 extending through the trailing edge 22 at a predetermined second angle $\theta_2$ with respect to the trailing edge, the members of the second plurality being substantially parallel with one another and coplanar; and preselected of the second plurality of passages aligned to intersect at least one of the first plurality of passages to form a number of nodes between the points of intersection thereof. As has been stated above, the present invention, and more particularly the method for forming a cooling slot, is adaptable to use with any heat plate wherein such cooling is suitable for operation.

During operation of the associated gas turbine engine, a cooling fluid is delivered by means not shown into the internal cavity 16 of blade 10. A portion of this fluid is directed through cooling slot 22 of the trailing edge 14 in order to cool the trailing edge. As this fluid passes through the multiplicity of passages 26 and 28 forming cooling slot 22 and prior to its exit through ports 24, the fluid engages the nodes 30. The nodes serve to increase the surface area of the slot presented to the fluid for heat transfer therebetween, as well as to promote turbulent fluid flow within the slot. Both of these characteristics result in improved heat transfer, and an attendant reduction in cooling fluid expenditure. The method and configuration presented by the present invention enable such a slot to be manufactured and utilized without the unfortunate drawback cited with respect to the prior art.

While the present invention has been disclosed in a particular embodiment thereof, the concepts of this invention are not limited to such embodiment. For example, while the presentation herein is limited to airfoil blades, similar constructions and techniques fulfill similar requirements with respect to other types of heated plate structures. Also, while the method described herein involves drilling, other hole-forming methods will suffice. Those skilled in the art will be able to devise other variations without departing from the spirit of the present invention. It is contemplated that such variations be incorporated within the appended claims.

What is considered new and desired to be secured by Letters Patent of the United States is:

We claim:

1. An airfoil blade for use in gas turbine engines, the blade comprising:
   a leading edge;
   a trailing edge;
   an internal cavity housing a quantity of cooling fluid; and
   a trailing edge slot extending from said cavity through said trailing edge, said slot including first and second pluralities of passages, preselected of the first passages intersecting preselected of the second passages and defining nodes between the points of intersection, wherein preselected of the nodes are generally polygonal in the cross section and present one of their vertices to the direction of cooling fluid flow.

2. The blade of claim 1 wherein said cooling fluid flows through said slot generally axially of the blade, individuals of said first and second pluralities of passages are generally parallel with one another, respectively, and are aligned at first and second angles with respect to the axial direction, respectively, and the vertex of individual nodes defined by the intersection of individuals of said first and second pluralities is thus presented to the axially flowing cooling fluid.

3. The blade of claim 2 wherein said nodes are generally rectangular in the cross section.

4. The blade of claim 3 wherein said first and second pluralities of passages are substantially coplanar.

* * * * *